United States Patent [19]

Grzywinski

[11] Patent Number: 4,764,410
[45] Date of Patent: Aug. 16, 1988

[54] LOUVERED PLASTIC FILM AND METHOD OF MAKING THE SAME

[75] Inventor: Robert F. Grzywinski, Oakdale, Minn.

[73] Assignee: Minnesota Mining and Manufacturing Company, St. Paul, Minn.

[21] Appl. No.: 908,900

[22] Filed: Sep. 18, 1986

Related U.S. Application Data

[63] Continuation of Ser. No. 717,820, Mar. 29, 1985, abandoned.

[51] Int. Cl.⁴ .............................................. B05D 3/06
[52] U.S. Cl. ................................. 428/120; 427/54.1; 156/272.2
[58] Field of Search ........................... 427/44, 54.1; 156/272.2, 272.3; 428/120

[56] References Cited

U.S. PATENT DOCUMENTS

| | | | |
|---|---|---|---|
| Re. 27,617 | 4/1973 | Olsen | 161/6 |
| 3,653,138 | 4/1972 | Cooper | 40/130 R |
| 3,707,416 | 12/1972 | Stevens | 156/196 |
| 3,791,722 | 2/1974 | Ahlberg et al. | 351/45 |
| 3,919,559 | 11/1975 | Stevens | 250/508 |
| 3,922,440 | 11/1975 | Wegwerth et al. | 428/437 |
| 3,929,545 | 12/1975 | Van Dyck et al. | 156/273.3 |
| 4,128,685 | 12/1978 | Lowrey et al. | 428/212 |
| 4,218,279 | 8/1980 | Green | 156/273.3 |
| 4,268,337 | 5/1981 | Ibata et al. | 156/272.2 |
| 4,330,590 | 5/1982 | Vesley | 428/336 |
| 4,415,615 | 11/1983 | Esmay et al. | 428/40 |

*Primary Examiner*—John H. Newsome
*Attorney, Agent, or Firm*—Donald M. Sell; Stephen W. Buckingham

[57] ABSTRACT

Louvered plastic film can be more easily handled and installed by coating at least one surface with a solvent-free monomer composition and exposing the coating to ultraviolet radiation to polymerize the composition to an adhesive state, preferably a pressure-sensitive adhesive state.

17 Claims, 1 Drawing Sheet

LOUVERED PLASTIC FILM AND METHOD OF MAKING THE SAME

REFERENCE TO RELATED APPLICATIONS

This application is a continuation of application Ser. No. 717,820 filed Mar. 29, 1985, now abandoned.

FIELD OF THE INVENTION

The invention provides a method of supporting a louvered plastic film to permit it to be handled and transported without danger of damage. As supported, the louvered plastic film should be more convenient to apply to typical uses than are louvered plastic films now on the market. The supporting structure produced by the novel method is a composite which itself is believed to be novel.

BACKGROUND ART

U.S. Pat. No. Re. 27,617 (Olsen) discloses a process of making a louvered light control film by skiving a billet of alternating layers of plastic having relatively low (clear) and relatively high (pigmented) optical densities. Upon skiving the billet, the pigmented layers provide light-collimating louver elements which, as illustrated in the patent, may extend orthogonally to the surface of the resulting louvered plastic film. U.S. Pat. No. 3,707,416 (Stevens) discloses a process whereby the light-collimating louver elements may be canted with respect to the surface of the louvered plastic film. U.S. Pat. No. 3,919,559 (Stevens) teaches a process for attaining a gradual change in the angle of cant of successive light-collimating louver elements.

Among uses for louvered plastic films are as lenses in goggles as shown in U.S. Pat. No. 3,791,722 (Ahlberg et al.) to be worn where high levels of illumination or glare are encountered. When used as a transparent covering for a back-lighted instrument panel, a louvered plastic film minimizes reflections, e.g., from being cast onto the windshield of an automobile. A louvered plastic film can also be used to give a black-and-white photographic negative the appearance of a positive made from the negative, as taught in U.S. Pat. No. 3,653,138 (Cooper).

U.S. Pat. No. 4,128,685 (Lowrey et al.) reports that billets from which louvered plastic films have been skived often are heated during the skiving, but that the heat "may tend to be absorbed preferentially by the opaque louver material so that the billet employed is softer along the louver lines than along the clear or transparent lines" (col. 1, lines 13-21). The patent teaches how to select materials for the billet so that the alternating clear and pigmented (opaque) layers have relatively uniform heat absorptive ability. The preferred material for the pigmented layers comprises self-crosslinking anionic acrylates, water-soluble polyazo direct dyes such as "Formanil Black G", and finely divided silica.

U.S. Pat. No. 3,922,440 (Wegwerth et al.) points out that because louvered plastic films "are thin sheet materials: (1) they are not by themselves capable of structurally withstanding extreme stresses and (2) they are subject to distortion from physical stress and temperatures" (col. 1, lines 19-22). Furthermore, the skiving by which the louvered plastic films are produced results in irregular surfaces. Accordingly, as in Example 1 of that patent, the louvered plastic film usually is laminated under pressure between two clear plastic films, e.g., cellulose acetate butyrate, the material usually used in making louvered plastic films. Typically, the louvered plastic film is skived to a thickness from 0.2 to 0.4 mm, and each of the outer clear plastic films has a thickness of about 0.15 to 0.3 mm.

Wegwerth's process of laminating louvered plastic films between two clear films requires an expensive press that is expensive to operate, in part from the need to distribute heat uniformly, and in part from the need to apply pressure with precision. Because the resulting laminates cannot be larger than the platens of the press in which they are laminated, the press must be sufficiently large and expensive to produce the largest required size.

SUMMARY OF THE INVENTION

The invention provides an inexpensive method for supporting a louvered plastic film so that it can be handled and put to use with very little danger of damage. The resulting composite, which is believed to be new, can be produced in substantially continuous lengths that can be wound up for convenient storage or shipment and later unwound and cut to specific lengths with substantially no waste.

Briefly, the novel method comprises the steps of (1) coating the louvered plastic film with a solvent-free monomer composition which polymerizes upon exposure to ultraviolet radiation to an adhesive (preferably transparent) state, and (2) exposing the coating to ultraviolet radiation to polymerize the composition.

Preferably the monomer composition polymerizes to a pressure-sensitive adhesive state for convenience in bonding the louvered plastic film to a supporting member. Surprisingly, a pressure-sensitive adhesive layer as thin as 0.01 mm provides adequate support for a louvered plastic film. However, an adhesive layer of somewhat greater thickness, e.g., from 0.04 to 1.5 mm, is preferred to allow for surface irregularities of the louvered plastic film when bonding it to a supporting member.

Because the monomer composition may be polymerizable only in the absence of air, it may be covered by a transparent plastic film to protect it from air, and the coating may then be exposed through the transparent plastic film. When that transparent plastic film is abrasion-resistant, it may remain as a permanent layer of the resulting composite. Instead, the plastic film can have a release surface permitting it later to be peeled away to expose the adhesive layer by which the louvered plastic film can then be adhered to another supporting member such as a glass plate or a plastic sheet. Useful plastic sheets include polycarbonate, polymethylmethacrylate, polystyrene, and biaxially-oriented polyethylene terephthalate, all of which are clear and transparent. Of these, polycarbonate is preferred, because it is flexible and has excellent clarity and resistance to heat.

Whether or not the transparent plastic film is removable, an end-user may screen-print a design or message directly onto the opposite, exposed surface of the louvered plastic film and then overcoat that entire surface and its printing with an optically clear layer. Ordinarily, the composite would then be mounted for use with the printed surface protected from contact.

Both surfaces of a louvered plastic film may be coated with an ultraviolet-polymerizable composition, and after covering each coating with a transparent plastic film, both coatings may be simultaneously exposed to ultraviolet radiation. Preferably at least one of those transparent plastic films is selected to become firmly bonded to the adhesive layer when it is polymerized, thus lending greater strength to the composite.

THE DRAWING

In the drawing, all figures of which are schematic:

DETAILED DESCRIPTION OF THE INVENTION

Figure 1:
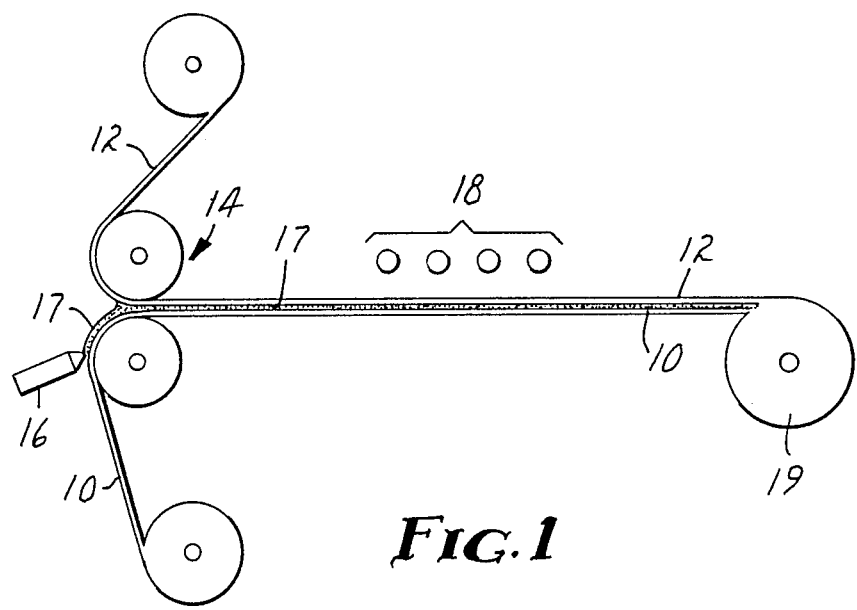
FIG. 1 shows an apparatus for applying an adhesive layer to a louvered plastic film to provide a composite of the invention.

In FIG. 1, a louvered plastic film 10 and a transparent plastic film 12 are being fed into a 2-roll coater 14 while a monomer composition from an extrusion bar 16 forms a coating 17 on the louvered plastic film. Upon passing beneath a bank of ultraviolet lamps 18, the monomer composition polymerizes to an adhesive state, and the resulting composite is wound upon itself into a roll 19. When the transparent plastic film 12 has a release surface contacting the polymerized coating 17, it may be peeled from the coating to allow the louvered plastic film 10 to be adhered by the exposed adhesive coating to a substrate.

Figure 2:
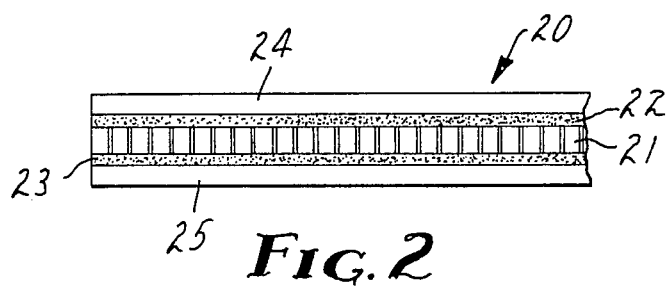
FIG. 2 is an edge view of another composite of the invention.

The composite 20 shown in FIG. 2 has a central louvered plastic film 21, a pair of adhesive coatings 22, 23, and a pair of transparent plastic films 24, 25 through which the adhesive coatings have been exposed to ultraviolet radiation from two banks of lamps (not shown), one facing each broad surface of the composite.

Figure 3:
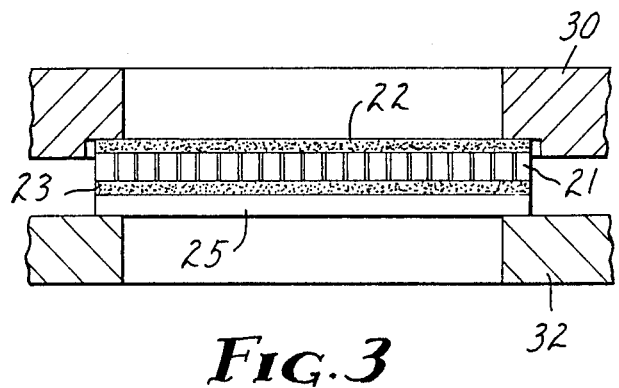
FIG. 3 is an edge view showing a use of the composite of FIG. 2.

The composite 20 of FIG. 2 may be used as illustrated in FIG. 3 by peeling off and discarding one of the transparent plastic films 24 and adhering the exposed adhesive coating 22 to a bezel of an instrument panel 30. The other transparent plastic film 25, which may be a polycarbonate film, remains permanently in place to protect the louvered plastic film 21. A decorative covering 32 protects the exposed edges of the louvered plastic film 21.

EXAMPLE 1

A louvered plastic film was prepared as described in U.S. Pat. No. 4,128,685 at column 2, lines 27-49. As there disclosed, its light-collimating louver elements comprise a mixture of finely divided silica and an unpurified black polyazo dye directly dispersed in an acrylate, its clear layers were cellulose acetate butyrate, and its thickness was about 0.15 mm. Onto one surface of the louvered plastic film was applied a coating (0.05 mm thick) of a partially polymerized blend of
90 parts of isooctyl acrylate
10 parts of acrylic acid
0.2 parts of photoinitiator
0.1 part of photoactive crosslinking agent.

The photoinitiator was 2,2-dimethoxy-2-phenyl acetophenone ("Irgacure 651"). The photoactive crosslinking agent was "Photoactive S-triazine B" of U.S. Pat. No. 4,330,590.

After covering the coating with a disposable transparent polyester film having a release surface, the coating was irradiated by a bank of 40-watt fluorescent black light lamps, i.e., F40T12/BL Sylvania, to provide an exposure of 400 millijoules, thus polymerizing the coating to a pressure-sensitive adhesive state. The resulting 3-layer composite was wound upon itself into roll form.

After removing the disposable transparent plastic film from a piece of the composite, its adhesive layer was used to laminate the louvered plastic film to biaxially oriented poly(ethylene terephthalate) film, the surface of which had been coated with polyvinylene chloride. With the louvered plastic film of the resulting composite against a rigid back plate, the polyester film was peeled back in an Instron Tensile Tester at the rate of 0.5 cm/sec. Resistance to peelback was about 90 to 110 N/dm, showing that the adhesive coating had become strongly bonded to the louvered plastic film.

In contrast, when a comparable preformed pressure-sensitive adhesive layer was transferred to an identical louvered plastic film, the resistance to peelback was on the order of 10 N/dm.

After removing the disposable film from another piece of the composite of this example, its exposed adhesive was used to laminate the louvered plastic film to a piece of polycarbonate film 0.5 mm in thickness. This composite was adhered to a bezel of a back-lighted instrument panel as in FIG. 3, with the louver elements extending horizontally. In a darkened room, no reflections were observed on a pane of glass positioned to simulate the windshield of an automobile.

After removing the disposable film from another piece of the composite of this example, it was suspended vertically in an oven at 65° C. for 7 days. No observable change occured. In contrast, an identical piece of louvered plastic film without any adhesive coating became physically deformed.

After removing the disposable film, a fresh piece of the composite of this example was suspended vertically in an oven at 38° C. and 100% relative humidity for 7 days. No observable change occurred. In contrast, an identical piece of louvered plastic film without any adhesive coating split.

I claim:

1. A method for supporting a louvered plastic film, which method comprises the steps of:
   (1) coating at least one major surface of a louvered plastic film skived from a billet with a solvent-free composition in a fluid state which polymerizes upon exposure to ultraviolet radiation to form an optical surface; then
   (2) bringing an ultraviolet transparent plastic film in surface contact with said coating of solvent-free composition in said fluid state to form a composite and to isolate said composition from the ambient atmosphere; and then
   (3) exposing said composite to sufficient ultraviolet radiation to polymerize said coating of solvent-free composition.

2. A method as defined in claim 1 further comprising the next step of 4) rolling said composite upon itself into a roll.

3. Method as defined in claim 1 wherein said ultraviolet transparent plastic film is selected to become pemanently bonded to the polymerized coating of solvent-free composition.

4. Method as defined in claim 1 wherein said ultraviolet transparent plastic film has a release surface permitting it later to be peeled away to expose said polymerized coating of solvent-free composition.

5. Method as defined in claim 1 further comprising the steps of peeling away said ultraviolet transparent plastic film, and employing the exposed polymerized coating of solvent-free composition to bond the louvered plastic film to a transparent supporting member.

6. Method as defined in claim 3 wherein said ultraviolet transparent plastic film is a film of a polycarbonate.

7. Method as defined in claim 1 wherein said exposing step comprises exposing said coating of solvent-free composition to sufficient radiation to polymerize said composition to an optically clear pressure-sensitive adhesive state.

8. Method as defined in claim 1 further comprising the steps of screen-printing a design or message directly onto the exposed surface of the louvered plastic film and then overcoating the printed face with an optically clear layer.

9. Method as defined in claim 1 including the steps of coating the other major surface of said louvered plastic film with said solvent-free composition, and exposing said other major surface to ultraviolet radiation to polymerize said solvent-free composition to an adhesive state 10. A composite louvered film product comprising:
a sheet of louvered plastic film having two major surfaces;
a layer of an ultraviolet radiation polymerized optically clear composition on at least one of said major surfaces; and
an ultraviolet transparent plastic film adhered to said layer.

11. A composite as defined in claim 10 wherein said layer is polymerized to an optically clear pressure-sensitive adhesive state.

12. A composite as defined in claim 11 wherein said ultraviolet transparent plastic film has a release surface permitting it to be peeled from said polymerized layer and discarded.

13. A composite as defined in claim 10 wherein said ultraviolet transparent plastic film is permanently bonded by said polymerized layer to the louvered plastic film.

14. A composite as defined in claim 13 wherein the transparent plastic film is a polycarbonate.

15. A composite as defined in claim 10 wherein both major surfaces of said louvered plastic film have a layer of an ultraviolet radiation polymerized optically clear composition and an ultraviolet transparent plastic film in contact with said layer.

16. A composite according to claim 10 wherein said layer of polymerized composition has a thickness between 0.04 and 1.5 mm and said composite is flexible.

17. A composite according to claim 15 wherein said layers of polymerized composition each have a thickness of between 0.04 and 1.5 mm and said composite is flexible.

* * * * *